United States Patent
Steingraber et al.

[11] Patent Number: 5,291,853
[45] Date of Patent: Mar. 8, 1994

[54] TOP UNLOADED MILKING CLAW

[75] Inventors: Gary C. Steingraber; Paul D. Thompson, both of Madison; Terrence J. Mullen, Sun Prairie, all of Wis.

[73] Assignee: DEC International, Inc., Madison, Wis.

[21] Appl. No.: 45,514

[22] Filed: Apr. 8, 1993

[51] Int. Cl.$^5$ .................................................. A01J 5/00
[52] U.S. Cl. .................................................. 119/14.54
[58] Field of Search ............... 119/14.37, 14.54, 14.55

[56] References Cited

U.S. PATENT DOCUMENTS

| | | | |
|---|---|---|---|
| 3,150,637 | 9/1964 | Fosnes | 119/14.54 |
| 4,136,639 | 1/1979 | Noorlander | 119/14.55 |
| 4,253,419 | 3/1981 | Yang . | |
| 4,314,526 | 2/1982 | Nordenskjold | 119/14.55 |
| 4,537,152 | 8/1985 | Thompson . | |
| 5,052,341 | 10/1991 | Woolford et al. . | |
| 5,076,211 | 12/1991 | Tonelli . | |

FOREIGN PATENT DOCUMENTS 8910684 11/1989 World Int. Prop. O. ....... 119/14.54

*Primary Examiner*—Gene Mancene
*Assistant Examiner*—Thomas Price
*Attorney, Agent, or Firm*—Andrus, Sceales, Starke & Sawall

[57] ABSTRACT

A top unloading milking claw (10) includes a high-impact transparent plastic lower bowl (12) and a stainless steel upper top (14). The claw has a plurality of deflectors (50, 52, 54, 56) on the inner surface (48) of the lower bowl (12) and spaced radially outwardly of the vertical riser outlet tube (28) by an annular gap (58) therebetween. The deflectors (50, 52, 54, 56) reduce tangential velocity of milk flow along the inner surface (48) of the bowl (12) by intercepting such tangential milk flow and redirecting the intercepted milk flow inwardly and downwardly along the inner surface (48) toward the bottom of the bowl (12) to fill the space (38) between the lower end (36) of the outlet tube (28) and the bottom of the bowl (12), to maximize the air pressure differential across the surface of the milk, between the ambient air pressure within the claw and the vacuum within the outlet tube, to maximize milk flow capacity of the claw (10). An acceleration surface (94) having a bell-shaped curve extends from the bottom of the bowl (12) upwardly into the outlet tube (28) and provides uniform acceleration of the milk as it enters the outlet tube (28), to minimize shear stress and energy loss as the milk is directed to flow upwardly through the outlet tube (28).

24 Claims, 2 Drawing Sheets

TOP UNLOADED MILKING CLAW

BACKGROUND

The invention relates to milking claws and more particularly the top unloading type.

Top unloading milking claws are known in the prior art, and include a lower bowl, an upper top closing the bowl, and a vertical riser outlet tube extending from the top downwardly into the bowl. The outlet tube is connected to a vacuum source for drawing milk from the bowl. The lower end of the outlet tube is adjacent the bottom of the bowl and spaced therefrom by a small space through which milk flows from the bowl into the outlet tube. Milk is forced into the outlet tube by the pressure differential between the air within the claw above the surface of the milk and the vacuum within the outlet tube, which pressure differential acts across and upon the surface of the milk within the bowl.

In some claws, inlets in the top direct incoming milk flow tangentially along the inner surface of the bowl. The milk swirls around the bowl and is pushed against the outer wall by a centrifugal force component such that the milk rotates about the center of the claw at a high angular velocity. Air, which is not as dense as milk, is able to flow downwardly along the exterior of the central outlet tube to the bottom of the bowl, and then flow into the outlet tube. This detracts from the noted function of the air within the bowl, namely to provide a pressure differential to act upon the surface of the milk to force milk into the outlet tube. When the milk swirls around the bowl, and air is allowed to flow downwardly to the bottom of the bowl, the noted air pressure differential decreases, which in turn decreases milk flow capacity of the claw. Agitation of high velocity air can also cause lipolysis.

SUMMARY

The present invention provides an improved top unloading milking claw.

In one aspect, the invention enables a particularly desirable combination of materials in a top unloading milking claw, including a stainless steel top, and a transparent bowl, preferably high-impact plastic. The top has a central aperture, and the outlet tube is a continuous integral hollow cylinder extending through the aperture and having inner and outer cylindrical sidewalls and extending from a lower section within the bowl upwardly through the aperture to an upper section exterior of and projecting above the top.

The invention further provides an improved performance top unloading milking claw, including improved air pressure differential forcing milk into the outlet tube, increased milk flow capacity, and improved milk flow velocity at the entry region into the outlet tube.

In one aspect of the invention, one or more deflectors are provided which reduce tangential velocity of milk flow along the inner surface of the bowl. The deflectors are on the inner surface of the bowl and spaced radially outward of the outlet tube by an annular gap therebetween. The deflectors intercept tangential milk flow and redirect milk flow along the inner surface of the bowl inwardly and downwardly toward the bottom to fill the space between the lower end of the outlet tube and the bowl. This maximizes the air pressure differential across the surface of the milk, i.e. the pressure differential between the air within the claw above the surface of the milk in the bowl and the vacuum within the outlet tube, which pressure differential is applied across and acts upon the surface of the milk. This in turn maximizes milk flow capacity of the claw.

In another aspect of the invention, an acceleration surface is provided which extends from the bottom of the bowl upwardly into the outlet tube a given distance above the lower end thereof and guides milk flow upwardly past such lower end. The acceleration surface includes a lower generally horizontal section spaced below the lower end of the outlet tube by a first gap, and a generally vertical section spaced radially inwardly of the cylindrical sidewall of the outlet tube by a second gap. Milk flows generally horizontally radially inwardly through the first gap and then turns and flows vertically upwardly through the second gap along the acceleration surface. The gaps have substantially the same width such that milk flow cross-sectional area decreases as the milk flows radially inwardly through the first gap and continues to decrease as the milk turns and flows upwardly into the outlet tube. The decreasing cross-sectional area causes increasing milk flow velocity and provides uniform acceleration of the milk as it enters the outlet tube, to minimize shear stress and energy loss as the milk is directed to flow upwardly through the outlet tube.

DETAILED DESCRIPTION

Figure 1:
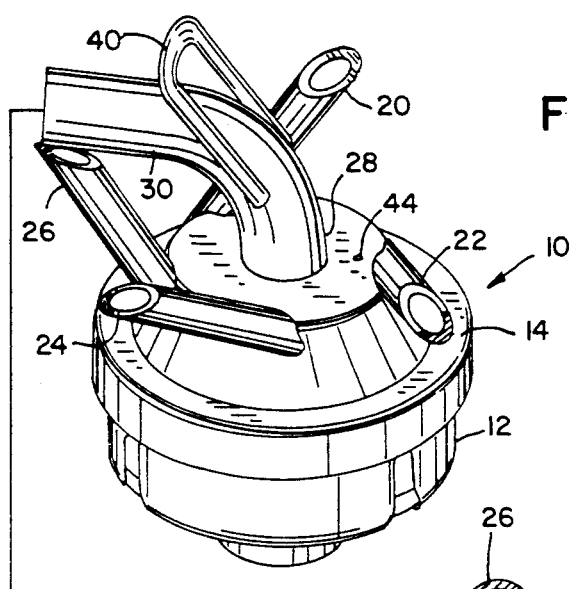
FIG. 1 is a perspective view showing a top unloading milking claw in accordance with the invention.
Figure 2:
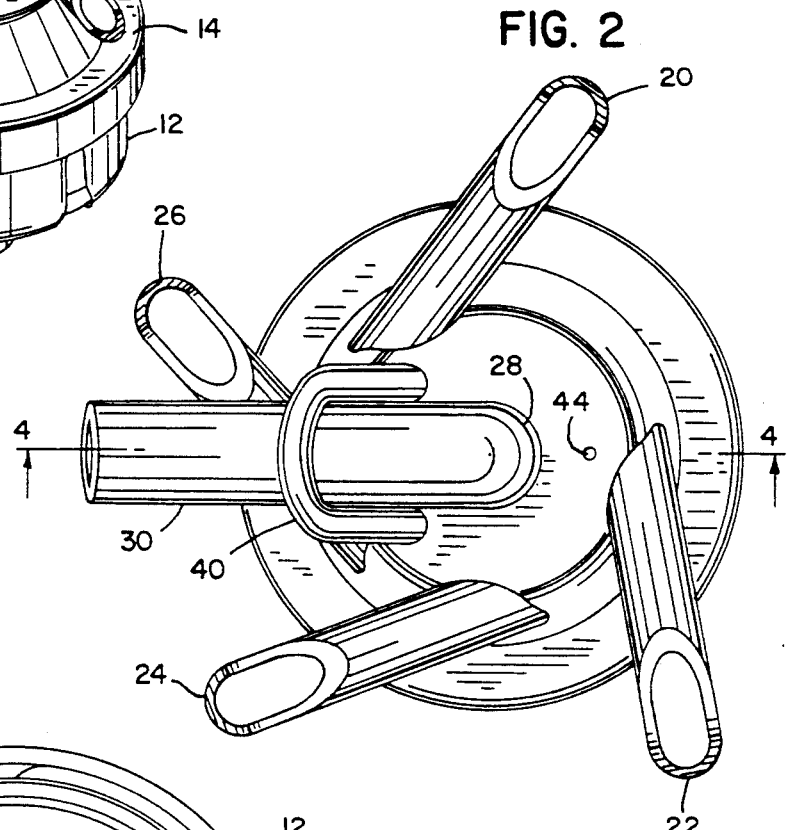
FIG. 2 is a top view of the claw of FIG. 1.
Figure 3:
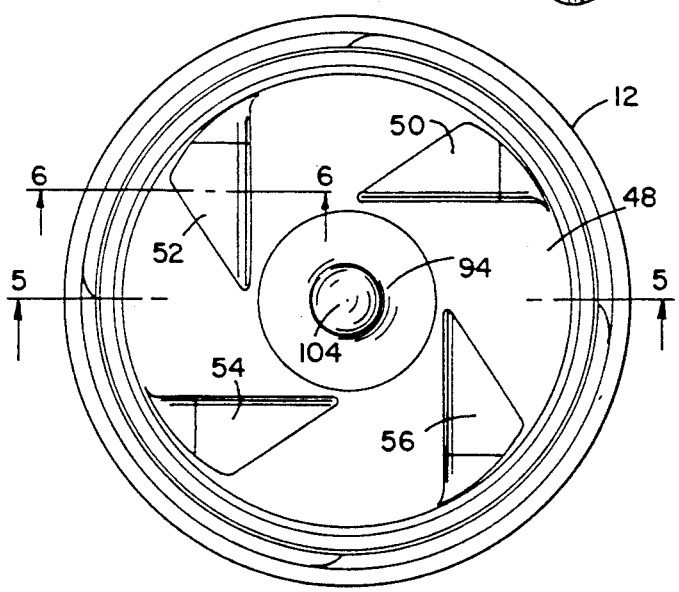
FIG. 3 is a top view of the claw of FIG. 1 with the top of the claw removed.
Figure 6:
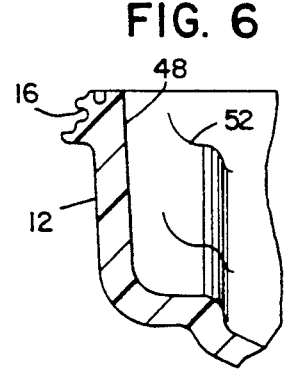
FIG. 6 is a sectional view taken along line 6—6 of FIG. 3.

FIG. 1 shows a top unloading milking claw 10 including a lower bowl 12, and an upper top 14 closing the bowl. Top 14 engages and closes lower bowl 12 at thread 16, FIG. 4, and engages and is sealed against the top lip of the bowl at annular seal 18. Inlets 20, 22, 24, 26 in top 14 are welded to top 14 and direct incoming milk flow into the bowl. Each of the inlets is connected to a respective teat cup (not shown). A vertical riser outlet tube 28 is welded to top 14 and extends downwardly therefrom into bowl 12. Outlet tube 28 has an upper section 30 connected to a vacuum source 32 for drawing milk from bowl 12, and has a lower cylindrical sidewall section 34 with a lower end 36 adjacent the bottom of the bowl and spaced therefrom by a small space 38 through which milk flows from the bowl into the outlet tube. The upper section of the outlet tube may include a hook 40 for hanging the claw from a support. A rubber bumper 42 is provided on the lower exterior surface of the bowl for protecting same. Top 14 includes an air vent 44 enabling entry of air into bowl 12, to afford the requisite differential pressure between the space above the level of the milk within the bowl and the space within outlet tube 28 subject to vacuum, such that the differential pressure forces milk out of the bowl and upwardly within outlet tube 28. In an alternative, air vents are provided in the respective teat cups connected to inlets 20, 22, 24, 26, as is known.

Bowl 12 is formed of a transparent high-impact plastic material, in one embodiment polysulfone. Top 14 and outlet tube 28 are stainless steel. Top 14 has a central aperture 15 therethrough, FIG. 4. Outlet tube 28 is a continuous integral hollow cylinder extending through aperture 15 and having inner and outer cylindrical sidewalls 28a and 28b and extending from lower section 34 within the bowl upwardly through aperture 15 to upper section 30 exterior of and projecting above top 14. Tube 28 has a lower outwardly turned horizontal flange 100, to be described, having a vertical thickness equal to the wall thickness between the inner and outer cylindrical sidewalls 28a and 28b.

Figure 4:
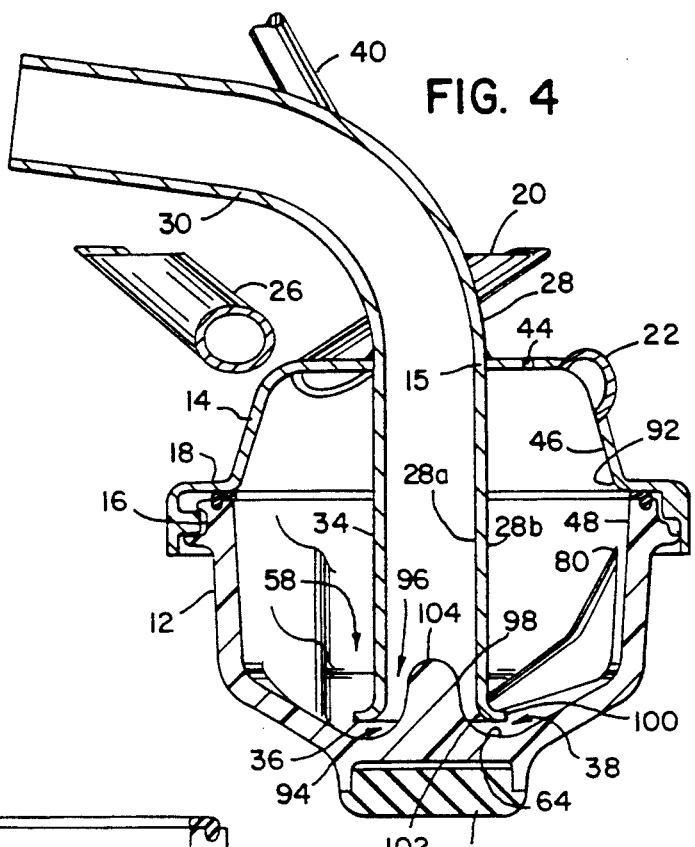
FIG. 4 is a sectional view taken along line 4—4 of FIG. 2.

The inner surface 46, FIG. 4, of top 14 has a frusto-conical shape. Inlets 20, 22, 24, 26 in top 14 direct incoming milk flow tangentially along frusto-conical inner surface 46, which surface directs the milk flow tangentially and downwardly, such that the milk flows tangentially and downwardly along inner surface 48 of bowl 12. The tangential flow of milk in top 14 is directed downward by the vertical component of the reaction force of inner surface 46 of the top against the milk, such that milk flow in bowl 12 has both a tangential component and a downward component.

Deflectors 50, 52, 54, 56, FIGS. 3-6 and 8, reduce tangential velocity of milk flow along inner surface 48 of bowl 12. The deflectors are on inner surface 48 of the bowl and spaced radially outwardly of outlet tube 28 by an annular gap 58 therebetween. The deflectors intercept tangential milk flow and redirect milk flow along the inner surface of the bowl inwardly and downwardly toward the bottom of the bowl to fill space 38 with milk. This maximizes the air pressure differential across the surface of the milk, i.e. the pressure differential between the air pressure within the claw above the surface of the milk in the bowl and the vacuum within the outlet tube. This in turn maximizes milk flow capacity of the claw.

Figure 5:
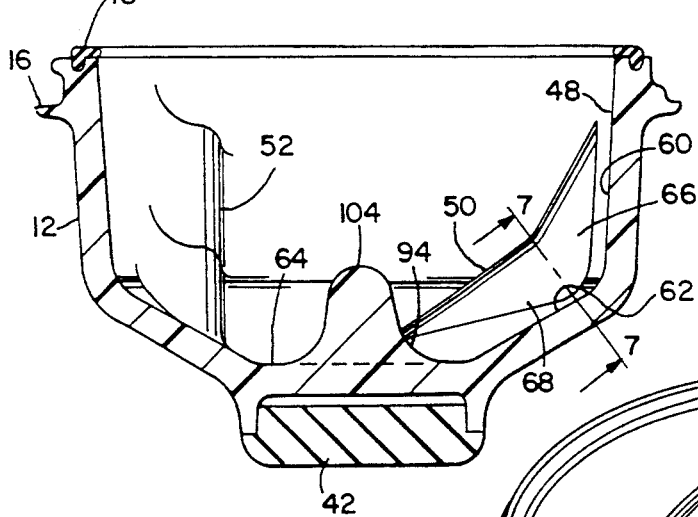
FIG. 5 is a sectional view taken along line 5—5 of FIG. 3.
Figure 7:
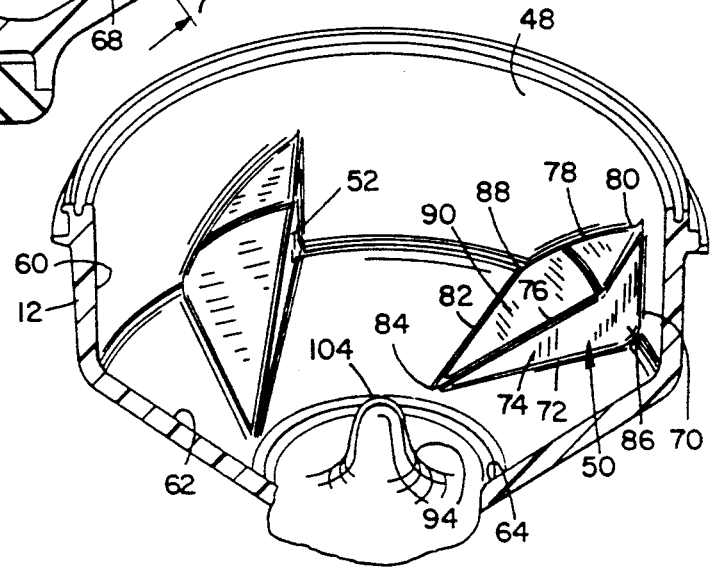
FIG. 7 is a sectional view taken along line 7—7 of FIG. 5.
Figure 8:
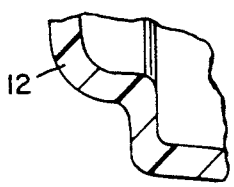
FIG. 8 is a perspective view of a portion of the claw of FIG. 3.

Inner surface 48 of bowl 12 includes a first portion 60, FIGS. 5 and 8, extending generally downwardly, and a second portion 62 sloping generally inwardly and downwardly to a lower central section 64 adjacent the lower end 36 of outlet tube 28. Each deflector includes a first portion, shown at 66 for deflector 50, FIG. 5, extending along first portion 60 of inner surface 48 of the bowl, and a second portion 68 extending along second portion 62 of the inner surface 48 of the bowl. First portion 66 of the deflector meets first portion 60 of inner surface 48 of the bowl along an interface 70, FIG. 8. Second portion 68 of the deflector meets second portion 62 of inner surface 48 of the bowl along interface 72. The deflector includes a transition surface 74 extending between interfaces 70 and 72. Transition surface 74 meets transition surface 90, to be described, along interface 76. Transition surface 74 is generally in the shape of a triangle defined by sides 70, 72, 76. Interface 76 extends from the top end of interface 70 to the inner end of interface 72. Transition surface 74 is a deflection surface which intercepts tangential milk flow below interface 76 of the triangle, and redirects the intercepted milk flow along the plane of such triangle.

Portion 66 of each deflector also meets portion 60 of inner wall 48 of the bowl along an interface 78, FIG. 8. Interfaces 70 and 78 meet at an upper apex 80 and diverge downwardly therefrom. Portion 68 of each deflector also meets portion 62 of inner surface 48 of the bowl along another interface 82, FIG. 8. Interfaces 72 and 82 meet at an inner apex 84 and diverge outwardly therefrom. Interfaces 70 and 72 meet at apex 86. Interfaces 78 and 82 meet at apex 88. Each deflector includes another transition surface 90 extending between interfaces 76, 78 and 82. Transition surface 74 meets transition surface 90 along interface 76 extending between apexes 80 and 84. As noted, transition surface 74 is generally in the shape of a triangle defined by first, second and third sides which are interfaces 70, 72, 76, respectively. Transition surface 90 is generally in the shape of a triangle defined by first, second and third sides which are interfaces 78, 82, 76, respectively.

As noted, transition surface 74 is a deflection surface which intercepts tangential milk flow below interface 76, and redirects such intercepted milk flow along the plane of transition surface 74. Transition surface 90 slopes downwardly from interface 76 and generally in the same direction as tangential milk flow, such that tangential milk flow above interface 76 flows downwardly and tangentially along transition surface 90 for interception by the next deflector, e.g. 52 in FIG. 8. It is preferred that upper edge or apex 80 of the deflectors in bowl 12 be proximate the lower edge 92, FIG. 4, of frusto-conical inner surface 46 of top 14, such that when the milk flow is directed downwardly and tangentially into the bowl by frusto-conical inner surface 46, the milk is quickly intercepted by deflectors 50, 52, 54, 56 and directed by the deflectors to the bottom of the bowl to fill space 38.

An acceleration surface 94, FIGS. 4, 5, 8, extends from the bottom of bowl 12 upwardly into outlet tube 28 and is spaced radially inwardly of cylindrical sidewall lower section 34 by an annulus 96 therebetween. The acceleration surface extends upwardly into outlet tube 28 a given distance above the lower end 36 thereof and guides milk flow along surface 94 upwardly past lower end 36. In preferred form, acceleration surface 94 has a bell-shaped curve. Acceleration surface 94 includes a lower generally horizontal section at 64 spaced below the lower end 36 of outlet tube 28 by a first gap provided by the noted space 38. Acceleration surface 94 has a generally vertical section 98 spaced radially inwardly of cylindrical sidewall lower section 34 of outlet tube 28 by gap 96. Milk flows generally horizontally radially inwardly through gap 38 and then turns and flows generally vertically upwardly through gap 96 along acceleration surface 94.

Gap 38 and the lower portion of gap 96 have substantially the same width such that the milk flow cross-sectional area decreases as the milk flows radially inwardly through gap 38 and continues to decrease as the milk turns and flows upwardly into outlet tube 28. The decreasing cross-sectional area causes increasing milk flow velocity and provides uniform acceleration of the milk as it enters outlet tube 28, to minimize shear stress and energy loss as the milk is directed to flow upwardly through outlet tube 28.

Outlet tube 28 has a lower horizontal flange 100 extending radially outwardly from the lower end 36 of outlet tube 28 and is spaced above horizontal section 64 of acceleration surface 94 by gap 38. Milk flows beneath horizontal flange 100 and then turns substantially ninety degrees and flows generally vertically upwardly. The lower end of outlet tube 28 includes a radiused transition at 102 between flange 100 and lower cylindrical sidewall section 34, to provide a less abrupt change in direction of the milk flow. Acceleration surface 94 is defined by generally vertical sides at 98 tapering slightly towards each other as the sides extend upwardly within outlet tube 28 to upper apex 104 at the top of the bell-shaped curve. The width of gap 96 thus increases slightly from the lower portion thereof to the upper portion thereof after milk flow has been uniformly accelerated.

It is recognized that various equivalents, alternatives and modifications are possible within the scope of the appended claims.

We claim:

1. A top unloading milking claw comprising a lower bowl, an upper top closing said bowl, at least one inlet in said top directing incoming milk flow into said bowl, a vertical riser outlet tube extending from said top downwardly into said bowl and having an upper section connected to a vacuum source for drawing milk from said bowl, and having a lower section with a lower end adjacent the bottom of said bowl and spaced therefrom by a small space through which milk flows from said bowl into said outlet tube, wherein said upper top has a central aperture therethrough, and wherein said outlet tube comprises a continuous integral hollow cylinder extending through said aperture and having inner and outer cylindrical sidewalls and extending from said lower section within said bowl upwardly through said aperture to said upper section exterior of and projecting above said top.

2. The invention according to claim 1 wherein said tube has a lower outwardly turned horizontal flange having a vertical thickness equal to the wall thickness between said inner and outer cylindrical sidewalls.

3. A top unloading milking claw comprising a lower bowl, a stainless steel upper top closing said bowl, said top having a central aperture therethrough, at least one inlet in said top directing incoming milk flow into said bowl, a stainless steel vertical riser outlet tube comprising a continuous integral hollow cylinder extending through said aperture and having inner and outer cylindrical sidewalls and extending from said top downwardly into said bowl and having an upper section connected to a vacuum source for drawing milk from said bowl, and having a lower section with a lower end adjacent the bottom of said bowl and spaced therefrom by a small space through which milk flows from said bowl into said outlet tube, said inner and outer cylindrical sidewalls extending from said lower section within said bowl upwardly through said aperture to said upper section exterior of and projecting above said top.

4. A top unloading milking claw comprising a lower bowl, an upper top closing said bowl, at least one inlet in said top directing incoming milk flow tangentially along the inner surface of said bowl, a vertical riser outlet tube extending from said top downwardly into said bowl and having an upper section connected to a vacuum source for drawing milk from said bowl, and having a lower section with a lower end adjacent the bottom of said bowl and spaced therefrom by a small space through which milk flows from said bowl into said outlet tube, at least one deflector reducing tangential velocity of milk flow along said inner surface of said bowl.

5. The invention according to claim 4 wherein said deflector is on said inner surface of said bowl and spaced radially outwardly of said outlet tube by a gap therebetween.

6. The invention according to claim 5 wherein said deflector on said inner surface of said bowl intercepts tangential milk flow and redirects milk flow along said inner surface inwardly and downwardly towards said bottom of said bowl to fill said space between said lower end of said outlet tube and said bowl, to maximize milk flow capacity of said claw.

7. The invention according to claim 6 wherein said outlet tube is subject to vacuum such that there is a pressure differential between the interior of said claw and said outlet tube forcing milk into said outlet tube, and wherein said deflector on said inner surface of said bowl spaced radially outwardly of said outlet tube by said gap intercepts tangential milk flow and redirects milk flow along said inner surface of said bowl inwardly and downwardly toward said bottom to fill said space with milk, to maximize the pressure differential across the surface of the milk.

8. The invention according to claim 6 wherein said inner surface of said bowl includes a first portion extending generally downwardly, and a second portion extending generally inwardly to a central section adjacent said lower end of said outlet tube, and wherein said deflector includes a first portion extending along said first portion of said inner surface of said bowl, and a second portion extending along said second portion of said inner surface of said bowl.

9. The invention according to claim 8 wherein said first portion of said deflector meets said first portion of said inner surface of said bowl along a first interface, said second portion of said deflector meets said second portion of said inner surface of said bowl along a second interface, and wherein said deflector comprises a transition surface extending between said first and second interfaces.

10. The invention according to claim 9 wherein said first interface has top and bottom ends, said second interface has inner and outer ends, and said transition surface is generally in the shape of a triangle defined by first, second and third sides, said first and second sides being said first and second interfaces, respectively, said third side extending from the top end of said first interface to the inner end of said second interface.

11. The invention according to claim 10 wherein said transition surface is a deflection surface intercepting tangential milk flow below said third side of said triangle, and redirecting milk flow along the plane of said triangle.

12. The invention according to claim 6 wherein:
said first portion of said deflector meets said first portion of said inner surface of said bowl along first and second interfaces meeting at an upper first apex and diverging downwardly therefrom;
said second portion of said deflector meets said second portion of said inner surface of said bowl along third and fourth interfaces meeting at an inner second apex and diverging outwardly therefrom;
said first and third interfaces meet at a third apex;
said second and fourth interfaces meet at a fourth apex;
said deflector comprises a first transition surface extending between said first and third interfaces;
said deflector comprises a second transition surface extending between said second and fourth interfaces;
said first transition surface meets said second transition surface along a fifth interface extending between said first and second apexes.

13. The invention according to claim 12 wherein:
said first transition surface is generally in the shape of a first triangle defined by first, second and third sides which are said first, third and fifth interfaces, respectively;
said second transition surface is generally in the shape of a second triangle defined by first, second and third sides which are said second, fourth and fifth interfaces, respectively.

14. The invention according to claim 12 wherein:
said first transition surface is a deflection surface intercepting tangential milk flow below said fifth interface, and redirecting milk flow along the plane of said first transition surface;
said second transition surface slopes downwardly from said fifth interface and generally in the same direction as tangential milk flow, such that tangential milk flow above said fifth interface flows downwardly and tangentially along said second transition surface.

15. The invention according to claim 14 comprising a plurality of said deflectors circumferentially spaced along said inner surface of said bowl, and wherein tangential milk flow above said fifth interface flows downwardly and tangentially along said second transition surface for interception by the next deflector.

16. The invention according to claim 5 comprising a plurality of said deflectors on said inner surface of said bowl and spaced radially outwardly of said outlet tube by an annular gap therebetween.

17. The invention according to claim 4 wherein said top has an inner surface with a frusto-conical shape directing milk flow tangentially and downwardly into said bowl, tangential milk flow in said top being directed downward by the vertical component of the reaction force of said inner surface of said top against the milk.

18. The invention according to claim 17 wherein said frusto-conical inner surface of said top has a lower edge, and said deflector has an upper edge proximate said lower edge of said frusto-conical inner surface, such that when the milk flow is directed downwardly and tangentially into said bowl by said frusto-conical inner surface of said top, the milk is quickly intercepted by said deflector and directed by said deflector to the bottom of said bowl to fill said space.

19. A top unloading milking claw comprising a lower bowl, an upper top closing said bowl, at least one inlet in said top directing incoming milk flow into said bowl, a vertical riser outlet tube extending from said top downwardly into said bowl and having an upper section connected to a vacuum source for drawing milk from said bowl, and having a lower cylindrical sidewall section with a lower end adjacent the bottom of said bowl and spaced therefrom by a small space through which milk flows from said bowl into said outlet tube, an acceleration surface extending from said bottom of said bowl upwardly into said outlet tube and spaced radially inwardly of said cylindrical sidewall section by an annulus therebetween,
wherein said acceleration surface extends upwardly into said outlet tube a given distance above said lower end thereof and guides milk flow along said acceleration surface upwardly past said lower end of said outlet tube, and
wherein said acceleration surface includes a lower generally horizontal section spaced below said lower end of said outlet tube by said small space providing a first gap, and said acceleration surface includes a generally vertical section spaced radially inwardly of said cylindrical sidewall section of said outlet tube by a second gap, wherein milk flows generally horizontally radially inwardly through said first gap and then turns and flows generally vertically upwardly through said second gap along said acceleration surface.

20. The invention according to claim 19 wherein said first gap and the lower portion of said second gap have substantially the same width such that milk flow cross-sectional area decreases as the milk flows radially inwardly through said first gap and continues to decrease as the milk turns and flows upwardly into said outlet tube, said decreasing cross-sectional area causing increasing milk flow velocity and providing uniform acceleration of the milk as it enters said outlet tube, to minimize shear stress and energy loss as the milk is directed to flow upwardly through said outlet tube.

21. The invention according to claim 20 wherein said acceleration surface is defined by generally vertical sides tapering slightly toward each other as said sides extend upwardly within said outlet tube such that the width of said second gap increases slightly from the lower portion thereof to the upper portion thereof after said milk flow has been uniformly accelerated into said outlet tube.

22. The invention according to claim 19 wherein said outlet tube has a lower horizontal flange extending radially outwardly from said lower end and spaced above said acceleration surface by said first gap, and wherein milk flows beneath said horizontal flange and then turns substantially 90 degrees and flows generally vertically upwardly.

23. The invention according to claim 22 wherein said lower end of said outlet tube includes a radiused transition between said flange and said cylindrical sidewall section of said outlet tube, to provide for a less abrupt change in direction of milk flow.

24. A top unloading milking claw comprising a lower bowl, an upper top closing said bowl, at least one inlet in said top directing incoming milk flow into said bowl, a vertical riser outlet tube extending from said top downwardly into said bowl and having an upper section connected to a vacuum source for drawing milk from said bowl, and having a lower section with a lower end adjacent the bottom of said bowl and spaced therefrom by a small space through which milk flows from said bowl into said outlet tube, an acceleration surface having a bell-shaped curve and extending from said bottom of said bowl upwardly into said outlet tube a given distance above said lower end of said outlet tube.

* * * * *